United States Patent [19]

Umehara

[11] Patent Number: 5,220,162

[45] Date of Patent: Jun. 15, 1993

[54] DISK FOR REVOLUTION SENSOR HAVING AT LEAST THREE ENGAGING PORTIONS

[75] Inventor: Keiichi Umehara, Niwa, Japan

[73] Assignee: Kabushiki Kaisha Tokai-Rika-Denki-Seisakusho, Aichi, Japan

[21] Appl. No.: 895,020

[22] Filed: Jun. 8, 1992

[30] Foreign Application Priority Data

Jun. 10, 1991 [JP] Japan .............................. 3-43158[U]

[51] Int. Cl.$^5$ .............................................. G01D 5/30
[52] U.S. Cl. .............................................. 250/231.13
[58] Field of Search ...................... 250/231.13–231.18, 250/237 G; 341/13

[56] References Cited

U.S. PATENT DOCUMENTS 4,654,522 3/1987 Gornick et al. ................ 250/231.13
5,117,104 5/1992 Kobayashi et al. ............ 250/231.13

Primary Examiner—David C. Nelms
Assistant Examiner—S. Allen
Attorney, Agent, or Firm—Oliff & Berridge

[57] ABSTRACT

Disclosed is a disk for a revolution sensor including: a disk-like base plate having a circular hole formed in a central portion thereof and a plurality of detection holes formed in an outer peripheral portion thereof; and a resin portion integrally secured to an inner peripheral portion of the base plate and provided with a holding hole. The holding hole has a diameter smaller than that of the circular hole and is formed coaxially with the circular hole. A plurality of notched portions are formed circumferentially at equal intervals in the inner peripheral portion of the base plate, and are integrally engaged with the resin portion. Accordingly, the relative movement of the base plate and the resin portion is prevented, and the circularity of the holding hole and the coaxiality of the holding hole with respect to the circular hole are improved.

16 Claims, 4 Drawing Sheets

DISK FOR REVOLUTION SENSOR HAVING AT LEAST THREE ENGAGING PORTIONS

BACKGROUND OF THE INVENTION

1. Field of the Invention

The present invention relates to a disk for a revolution sensor which is used in a steering sensor of an automobile or the like.

2. Description of the Related Art

In a steering sensor of an automobile, the steering angle or the like of a steering wheel can be detected by detecting a disk 150 for a revolution sensor which is secured to a steering shaft (not shown), as shown in FIGS. 7 and 8.

The disk 150 for a revolution sensor is formed such that an annular holding member 154 made of a synthetic resin and having a holding hole 154A is molded in such a manner as to cover the three sides of an inner peripheral portion of a disk-like slit plate 152, i.e., such that the slit plate 152 is inserted in the holding member 154. A plurality of slits 153, i.e., detection holes, are formed circumferentially at equal intervals in the vicinity of an outer periphery of the slit plate 152. Furthermore, a circular hole 156 is formed in a central portion of the slit plate 152. As shown in FIGS. 7 and 8, a pair of circular holes 155 are formed in a peripheral edge portion of this circular hole 156 in such a manner that a central angle thereof becomes 180°.

When the disk 150 for a revolution sensor is formed, the slit plate 152 is set in an unillustrated mold, a resin in a molten state is poured into a cavity in the mold, and the resin is allowed to solidify both in the circular holes 155 and over the three sides of the inner peripheral portion of the slit plate 152. The resin is solidified in the central portion of the slit plate 152 integrally with the slit plate 152, and is used as the holding member 154. The disk 150 for a revolution sensor is thus formed. The holding member 154 has relative-movement preventing portions 158 which are formed as the resin poured into the circular holes 155 are hardened. The relative movement preventing portions 158 are tightly secured in the circular holes 155 so as to prevent the relative movement of the holding member 154 and the slit plate 152.

However, with the conventional disk 150 for a revolution sensor, since only one pair of circular holes are formed in the slit plate 152, variations occur in the amount of thermal deformation of the resin because the thickness of the holding member 154 around the peripheral edge portion of the circular hole 156 is not uniform over the entire circumference of the circular hole 156. Accordingly, it is difficult to maintain the coaxiality of the holding hole 154A with respect to the circular hole 156 with high accuracy. In addition, it is difficult to sufficiently secure circularity because the holding hole 154A becomes elliptical, for instance. Accordingly, even if the disk 150 for a revolution sensor is mounted on a steering shaft by holding the steering shaft in the holding hole 154A whose coaxiality and circularity are not sufficient, it is difficult to detect the steering angle of the steering wheel with precision.

SUMMARY OF THE INVENTION

In view of the above-described circumstances, it is an object of the present invention to provide a disk for a revolution sensor which is capable of reliably preventing the relative movement of a base portion and a resin portion and of rendering highly accurate the circularity of a holding hole and the coaxiality of the holding hole with respect to a circular hole.

The disk for a revolution sensor in accordance with the present invention comprises: a disk-like base plate having a circular hole formed in a central portion thereof and a plurality of detection holes formed in an outer peripheral portion thereof, the detection holes being arranged circumferentially at equal intervals in a circle concentric with the circular hole; at least three engaging portions formed at equal intervals circumferentially in an inner peripheral portion of the base plate; and a resin portion integrally secured to the inner peripheral portion of the base plate and engaging with the engaging portions, the resin portion being provided with a holding hole which has a diameter smaller than that of the circular hole and is formed coaxially with the circular hole.

As described above, since the disk for a revolution sensor in accordance with the present invention is arranged such that the engaging portions formed in the base plate are formed integrally with the resin portion, it is possible to reliably prevent the relative rotation of the base portion and the resin portion.

In addition, since at least three engaging portions are formed at regular intervals circumferentially in the inner peripheral portion of the base plate, the circularity of the holding hole and the coaxiality of the holding hole with respect to the circular hole can be made highly accurate.

Since the above-described arrangement is provided, the disk for a revolution sensor in accordance with the present invention offers an outstanding advantage in that it is possible to provide a disk for a revolution sensor which is capable of reliably preventing the relative movement of the base portion and the resin portion and of rendering highly accurate the circularity of the holding hole and the coaxiality of the holding hole with respect to the circular hole.

The other objects, features and advantages of the present invention will become more apparent from the following detailed description of the invention when read in conjunction with the accompanying drawings.

DETAILED DESCRIPTION OF THE PREFERRED EMBODIMENTS

Figure 1:
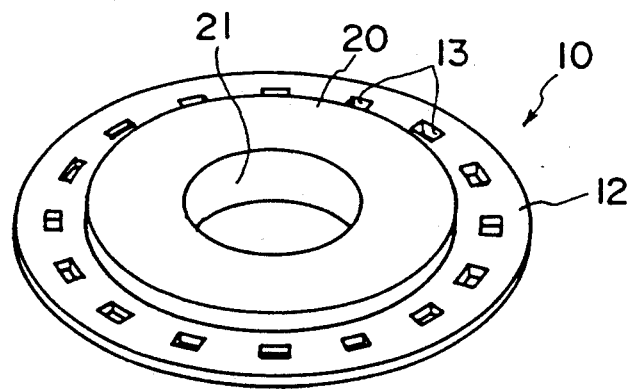
FIG. 1 is a perspective view of a disk for a revolution sensor in accordance with a first embodiment of the present invention.
Figure 2:
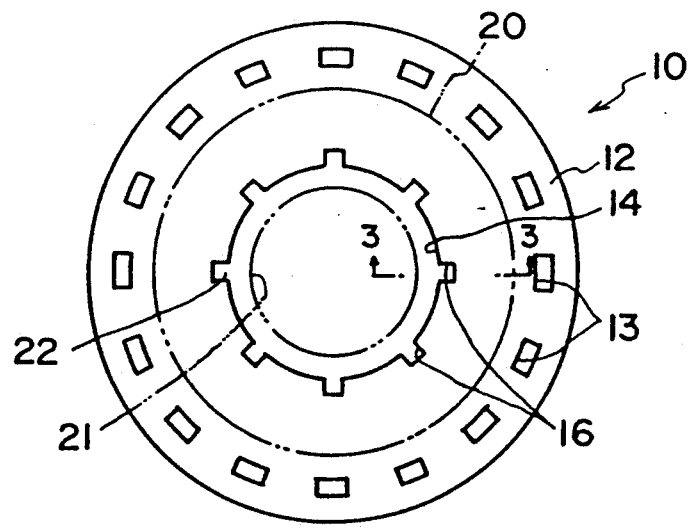
FIG. 2 is a plan view of a slit plate constituting a part of the disk for a revolution sensor shown in FIG. 1.
Figure 3:
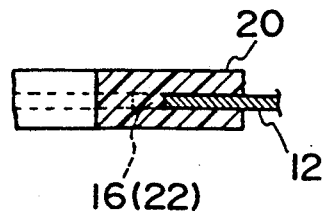
FIG. 3 is a cross-sectional view taken along line 3—3 in FIG. 2 illustrating a state after a holding member 20 has been formed.

Referring now to the accompanying drawings, a description will be given of the embodiments of the present invention. As shown in FIG. 1, a disk 10 for a revolution sensor which is used as a steering sensor or the like comprises a slit plate 12 serving as a base portion and a holding member 20 serving as a resin portion. As is also shown in FIG. 2, the slit plate 12 is formed in a disk-like configuration, and a circular through hole 14 is formed in a substantially central portion thereof. In addition, a plurality of slits 13 serving as detection holes are formed circumferentially at equal intervals in the vicinity of an outer periphery of the slit plate 12. Furthermore, notches 16 are formed in the slit plate 12, as is also shown in FIG. 3. The notches 16 are each provided with a square or rectangular planar configuration as viewed from the end-face side of the disk 10 for a revolution sensor, and the notches 16 serve as engaging portions. The notches 16 are formed in such a manner as to extend from an inner peripheral wall surface of the slit plate 12, defining the through hole 14, toward the radially outer side of the slit plate 12, and are formed along the circumferential direction of the through hole 14 at equal intervals.

As shown in FIG. 1, the holding member 20 (a portion surrounded by two-dotted dash lines in FIG. 2) is molded over the three sides of an inner peripheral portion of the slit plate 12 radially interiorly of the slits 13 in such a manner as to cover the notches 16. As a result of this molding, a holding hole 21 having a smaller diameter than the through hole 14 is formed in a central portion of the holding member 20 coaxially with the through hole 14. Portions of the holding member 20 which are formed by being filled in the notches 16 serve as relative-movement preventing portions 22, which are secured in the inner walls of the notches 16. Consequently, the slit plate 12 and the holding member 20 are prevented from rotating relative to each other. When the disk 10 for a revolution sensor is formed, the slit plate 12 is set in an unillustrated mold, a resin in a molten state is poured into a cavity in the mold, and the resin is allowed to solidify on the three sides of the inner peripheral portion of the slit plate 12 and in the notches 16 for forming the relative-movement preventing portions 22. Although the resin shrinks during the solidification of the resin, since the multiplicity of notches 16 are formed at equal intervals in the inner peripheral surface of the slit plate 12 defining the through hole 14, the shrinkage of the resin takes place uniformly at portions of the slit plate 12 where the notches 16 are provided and where they are not. Hence, the holding hole 21 is formed with a high degree of circularity and with a high degree of coaxiality with respect to the through hole 14. The resin is solidified in the central portion of the slit plate 12 integrally with the slit plate 12, and is used as the holding member 20. Thus, the disk 10 for a revolution sensor is formed.

In a case where the disk 10 for a revolution sensor arranged as described above is applied to a steering sensor, the steering shaft is held in the holding hole 21 so as to secure the disk 10 for a revolution sensor to the steering shaft. In this case, radially projecting projections are formed on the inner wall of the holding hole 21, recesses fitting with these projections are provided in the steering shaft, and the projections and the recesses are engaged with each other, as necessary.

In addition, a photointerrupter (not shown) having a light-emitting element and a light-receiving element, which are disposed in face-to-face relation with the slit plate 12 placed therebetween, is mounted on the fixed side of the vehicle.

When the steering wheel is rotated by a vehicle occupant, the disk 10 for a revolution sensor also rotates. When one of the slits 13 reaches a position facing the light-emitting element, the light from the light-emitting element is transmitted through the slit 13, and this transmitted light is detected by the light-receiving element, thereby setting the photointerrupter in an on state. Meanwhile, when the portion of the slit plate 12 where the slit 13 is not formed faces the light-emitting element, the light is interrupted by this portion, and the light is not detected by the light-receiving element, so that the photointerrupter is set in an off state. As the on/off state of this photointerrupter is detected, the angle of rotation of the steering angle can be detected.

As described above, in accordance with this embodiment, since the relative-movement preventing portions 22 are secured in the inner walls of the notches 16 with the slit plate 12 and the holding member 20 secured to each other, the slit plate 12 and the holding member 20 can be prevented reliably from rotating relative to each other.

Figure 4:
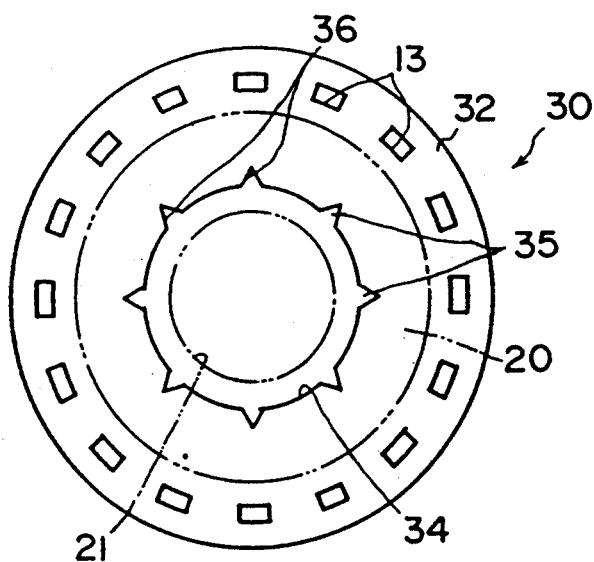
FIG. 4 is a plan view of a slit plate in accordance with a second embodiment of the present invention.

Referring now to FIG. 4, a description will be given of a disk for a revolution sensor in accordance with a second embodiment of the present invention. It should be noted that members which are identical to those of the first embodiment will be denoted by the same reference numerals, and a description thereof will be omitted.

The outer appearance of a disk 30 for a revolution sensor in this embodiment is similar to the disk 10 for a revolution sensor shown in FIG. 1. A slit plate 32 constituting a part of the disk 30 for a revolution sensor is formed in a disk-like configuration having a through hole 34 in a central portion thereof. Notches 36 are formed in the slit plate 32. The notches 36 are each provided with a substantially V-shaped planar configuration as viewed from the end-face side of the disk 30 for a revolution sensor, and the notches 36 serve as engaging portions. The notches 36 are formed in such a manner as to extend from an inner peripheral surface of the slit plate 32, defining a through hole 34, toward the radially outer side of the slit plate 32, and are formed along the circumferential direction of the through hole 34 at equal intervals.

When the disk 30 for a revolution sensor is formed, the holding member 20 is formed by solidifying the resin on the three sides of the inner peripheral portion of the slit plate 32 through molding in the same way as in the first embodiment. In this solidified state, relative-movement preventing portions 35 are secured in the notches 36 as parts of the holding member 20. As a result, the slit plate 32 and the holding member 20 are prevented from rotating relative to each other. In this embodiment as well, since the multiplicity of notches 36 are formed at equal intervals in the inner peripheral surface of the slit plate 32 defining the through hole 34, the holding hole 21 is formed with a high degree of circularity and with a high degree of coaxiality with respect to the through hole 34.

Figure 5:
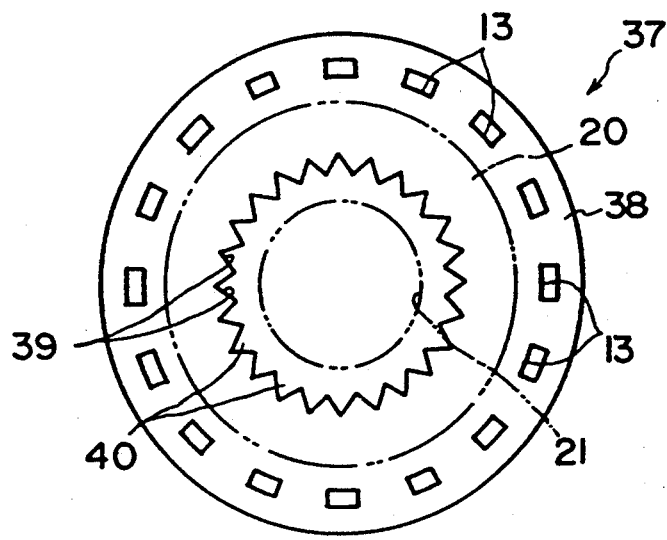
FIG. 5 is a plan view of a slit plate in accordance with a third embodiment of the present invention.

Referring now to FIG. 5, a description will be given of a disk for a revolution sensor in accordance with a third embodiment of the present invention. It should be noted that members which are identical to those of the first embodiment will be denoted by the same reference numerals, and a description thereof will be omitted.

The outer appearance of a disk 37 for a revolution sensor in this embodiment is similar to the disk 10 for a revolution sensor shown in FIG. 1. A slit plate 38 constituting a part of the disk 37 for a revolution sensor is formed in a disk-like configuration having a through hole in a central portion thereof. Notches 39, serving as engaging portions, are formed in the slit plate 38. The notches 39 are each provided with a substantially V-shaped planar configuration as viewed from the end-face side of the disk 37 for a revolution sensor. That is, the notches 39 are formed in such a manner as to extend from an inner peripheral surface of the slit plate 38 toward the radially outer side of the slit plate 38, and are formed continuously along the through hole, thereby forming a serriform configuration.

When the disk 37 for a revolution sensor is formed, the holding member 20 is formed by solidifying the resin on the three sides of the inner peripheral portion of the slit plate 38 through molding in the same way as in the first embodiment. In this solidified state, relative-movement preventing portions 40 are secured in the notches 39 as parts of the holding member 20. As a result, the slit plate 38 and the holding member 20 are prevented from rotating relative to each other.

In addition, since the notches 39 are formed in the slit plate 38 continuously over the entire inner peripheral surface of the slit plate 38 defining the through hole, and there are no variations in the shrinkage of the resin in the inner peripheral portion of the slit plate 38. Hence, the holding hole 21 is formed with a high degree of circularity and with a high degree of coaxiality with respect to the through hole in the slit plate 38.

Figure 6:
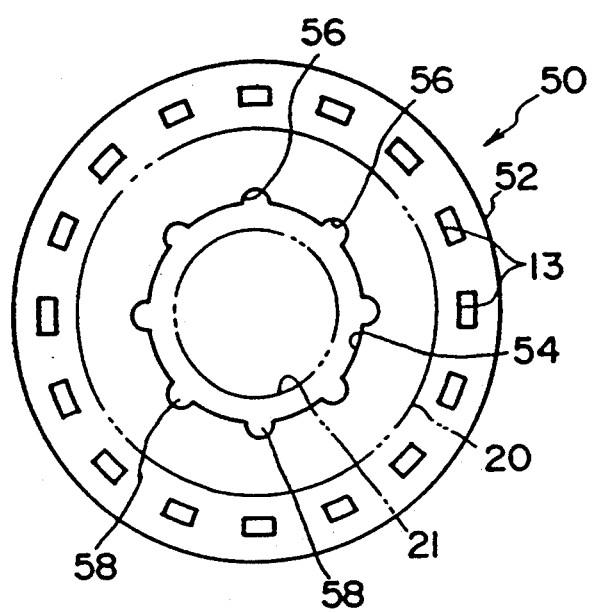
FIG. 6 is a plan view of a slit plate in accordance with a fourth embodiment of the present invention.
Figure 7:
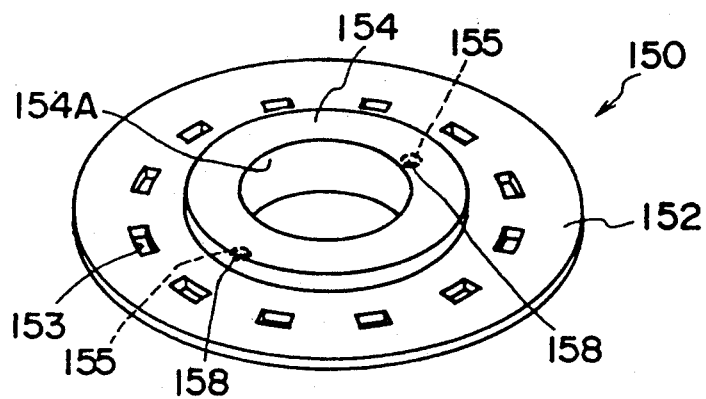
FIG. 7 is a perspective view of a conventional member to be detected.
Figure 8:
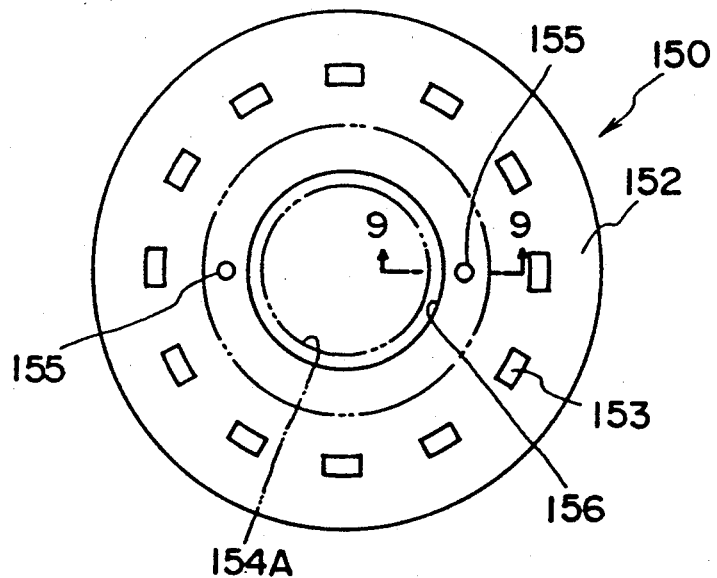
FIG. 8 is a plan view of a slit plate constituting a part of a conventional disk for a revolution sensor.
Figure 9:
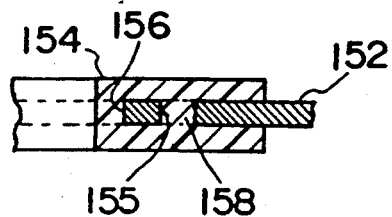
FIG. 9 is a cross-sectional view taken along line 9—9 in FIG. 8 illustrating a state after a holding member 154 has been formed.

Referring now to FIG. 6, a description will be given of a disk for a revolution sensor in accordance with a fourth embodiment of the present invention. It should be noted that members which are identical to those of the first embodiment will be denoted by the same reference numerals, and a description thereof will be omitted.

The outer appearance of a disk 50 for a revolution sensor in this embodiment is similar to the disk 10 for a revolution sensor shown in FIG. 1. A slit plate 52 constituting a part of the disk 50 for a revolution sensor is formed in a disk-like configuration having a through hole 54 in a central portion thereof. Notches 56 are formed in the slit plate 52. The notches 56 are each provided with a substantially semispherically-shaped planar configuration as viewed from the end-face side of the disk 50 for a revolution sensor, and the notches 56 serve as engaging portions. The notches 56 are cut out from an inner peripheral surface of the slit plate 52, defining a through hole 54, toward the radially outer side of the slit plate 52, and are formed along the circumferential direction of the through hole 54 at equal intervals.

When the disk 50 for a revolution sensor is formed, the holding member 20 is formed by solidifying the resin on the three sides of the inner peripheral portion of the slit plate 52 through molding in the same way as in the first embodiment. In this solidified state, relative-movement preventing portions 58 are secured in the notches 56 as parts of the holding member 20. As a result, the slit plate 52 and the holding member 20 are prevented from rotating relative to each other by means of the relative-movement preventing portions 58. In this embodiment as well, since the multiplicity of notches 56 are formed at equal intervals in the inner peripheral surface of the slit plate 52 defining the through hole 54, the holding hole 21 is formed with a high degree of circularity and with a high degree of coaxiality with respect to the through hole 54.

Although in the above-described embodiments a description has been given of a case where the disk for a revolution sensor is applied to the steering sensor, the present invention can be applied to general sensors for detecting an angle of rotation.

What is claimed is:

1. A disk for a revolution sensor, comprising:
    a disk-like base plate having a circular hole formed in a central portion thereof and a plurality of detection holes formed in an outer peripheral portion thereof, said detection holes being arranged circumferentially at equal intervals in a circle concentric with said circular hole;
    at least three engaging portions formed at equal intervals circumferentially in an inner peripheral portion of said base plate; and
    a resin portion integrally secured to said inner peripheral portion of said base plate and engaging with said engaging portions, said resin portion being provided with a holding hole which has a diameter smaller than that of said circular hole and is formed coaxially with said circular hole.

2. A disk for a revolution sensor according to claim 1, wherein said engaging portions are notched portions formed at equal intervals in said inner peripheral portion of said base plate.

3. A disk for a revolution sensor according to claim 2, wherein said notched portions are each formed in such a manner as to extend from said inner peripheral portion of said base plate toward the radially outer side of said base plate.

4. A disk for a revolution sensor according to claim 3, wherein each of said notched portions has one of square, rectangular, substantially V-shaped, and substantially semispherical configurations in a plan view of said base plate.

5. A disk for a revolution sensor according to claim 1, wherein said at least three engaging portions are a multiplicity of notched portions formed continuously in said inner peripheral portion of said base plate.

6. A disk for a revolution sensor according to claim 5, wherein said notched portions are each provided with a substantially V-shaped configuration in a plan view of said base plate.

7. A disk for a revolution sensor according to claim 2, wherein said resin portion is formed by molding.

8. A disk for a revolution sensor according to claim 7, wherein said resin portion includes relative-movement preventing portions for preventing the relative movement of said base plate and said resin portion by engaging said notched portions, said relative-movement preventing portions being formed by solidifying when a resin in a molten state is poured into said notched portions during the molding of said resin portion.

9. A disk for a revolution sensor for detecting a steering angle of a steering wheel of a vehicle, comprising:
    a disk member having a circular hole formed in a central portion thereof and a plurality of detection holes formed in an outer peripheral portion thereof and used for detecting of the steering angle, said detection holes being arranged circumferentially at equal intervals in a circle concentric with said circular hole;

at least three engaging portions formed at equal intervals circumferentially in an inner peripheral portion of said disk member; and a holding member integrally secured to said inner peripheral portion of said disk member and engaging with said engaging portions, said holding member being provided with a holding hole for holding a steering shaft, said holding hole having a diameter smaller than that of said circular hole and formed coaxially with said circular hole.

10. A disk for a revolution sensor according to claim 9, wherein said engaging portions are notched portions formed at equal intervals in said inner peripheral portion of said disk member.

11. A disk for a revolution sensor according to claim 10, wherein said notched portions are each formed in such a manner as to extend from said inner peripheral portion of said disk member toward the radially outer side of said disk member.

12. A disk for a revolution sensor according to claim 11, wherein each of said notched portions has one of square, rectangular, substantially V-shaped, and substantially semispherical configurations in a plan view of said disk member.

13. A disk for a revolution sensor according to claim 9, wherein said at least three engaging portions are a multiplicity of notched portions formed continuously in said inner peripheral portion of said disk member.

14. A disk for a revolution sensor according to claim 13, wherein said notched portions are each provided with a substantially V-shaped configuration in a plan view of said disk member.

15. A disk for a revolution sensor according to claim 10, wherein said holding member is formed of a resin and is formed by molding.

16. A disk for a revolution sensor according to claim 15, wherein said holding member includes relative-movement preventing portions for preventing the relative movement of said disk member and said holding member by engaging said notched portions, said relative-movement preventing portions being formed by solidifying when a resin in a molten state is poured into said notched portions during the molding of said holding member.

* * * * *